United States Patent
Haselhoff

(10) Patent No.: US 10,021,825 B2
(45) Date of Patent: Jul. 17, 2018

(54) METERING DISK OF A DISTRIBUTION DEVICE FOR GRANULAR MATERIAL

(71) Applicant: Horsch Maschinen GmbH, Schwandorf (DE)

(72) Inventor: Alexander Haselhoff, Schwandorf (DE)

(73) Assignee: Horsch Maschinen GmbH, Schwandorf (DE)

( * ) Notice: Subject to any disclaimer, the term of this patent is extended or adjusted under 35 U.S.C. 154(b) by 20 days.

(21) Appl. No.: 15/436,511

(22) Filed: Feb. 17, 2017

(65) Prior Publication Data

US 2017/0156255 A1 Jun. 8, 2017

Related U.S. Application Data

(63) Continuation-in-part of application No. 14/829,205, filed on Aug. 18, 2015, now abandoned.

(30) Foreign Application Priority Data

Aug. 18, 2014 (DE) .................... 10 2014 216 370

(51) Int. Cl.

| *A01C 7/04* | (2006.01) |
| *A01C 7/20* | (2006.01) |
| *G01F 15/00* | (2006.01) |
| *A01C 7/12* | (2006.01) |
| *A01C 7/08* | (2006.01) |
| *A01C 15/00* | (2006.01) |

(52) U.S. Cl.
CPC ............. *A01C 7/046* (2013.01); *A01C 7/04* (2013.01); *A01C 7/081* (2013.01); *A01C 7/128* (2013.01); *A01C 15/00* (2013.01); *G01F 15/00* (2013.01)

(58) Field of Classification Search
CPC ......... A01C 7/046; A01C 7/128; A01C 7/081; A01C 15/00; A01C 7/04; A01C 7/12; A01C 7/121; G01F 15/00
USPC .................................................. 111/183–185
See application file for complete search history.

(56) References Cited

U.S. PATENT DOCUMENTS

| 2,685,988 A | 8/1954 | Nelson et al. |
| 2,975,936 A | 3/1961 | Rousek |
| 3,347,426 A | 10/1967 | Morrison, Jr. et al. |

(Continued)

FOREIGN PATENT DOCUMENTS

| DE | 450125 A | 10/1927 |
| DE | 1683253 U | 9/1954 |

(Continued)

*Primary Examiner* — John Weiss
(74) *Attorney, Agent, or Firm* — Erickson Kernell IP, LLC

(57) ABSTRACT

Disclosed is a rotating conveyor disk of a metering or sowing unit having a plurality of recesses for transporting grains. The conveyor disk rotates within a housing of a metering unit for granular material, such as seeds, fertilizer, or the like. The conveyor disk has at least one recess at the outer periphery for the reception of at least one grain to be separated via at least one revolution of the conveyor disk. In the interaction with a groove-shaped profile of the inner cover surface, the at least one recess forms a conveyor pocket for conveying one grain or a plurality of grains in the direction toward an outlet opening extending approximately tangentially to the inner cover surface. The at least one recess is located at the outer periphery of the conveyor disk in an insert element that is detachably secured in the disk.

20 Claims, 10 Drawing Sheets

(56) References Cited

U.S. PATENT DOCUMENTS

| | | |
|---|---|---|
| 3,387,746 A | 6/1968 | Whipple |
| 3,434,437 A | 3/1969 | Mark et al. |
| 3,572,547 A | 3/1971 | Walberg |
| 3,618,820 A | 11/1971 | Keeton |
| 3,627,050 A | 12/1971 | Hansen et al. |
| 3,636,897 A | 1/1972 | Brink |
| 3,638,829 A | 2/1972 | Frase et al. |
| 3,693,833 A | 9/1972 | Weitz |
| 3,741,437 A * | 6/1973 | Ward ........................ A01C 7/04 111/184 |
| 3,999,690 A * | 12/1976 | Deckler .................. A01C 7/046 111/63 |
| 4,703,868 A | 11/1987 | Shaw |
| 5,027,725 A | 7/1991 | Keeton |
| 5,170,909 A * | 12/1992 | Lundie ................... A01C 7/046 221/211 |
| 6,516,733 B1 | 2/2003 | Sauder et al. |
| 8,371,240 B2 | 2/2013 | Wollenhaupt et al. |
| 9,332,688 B2 | 5/2016 | Zumdome et al. |
| 9,936,628 B2 * | 4/2018 | Wilhelmi ............... A01C 7/121 |
| 2010/0224110 A1 * | 9/2010 | Mariman ............... A01C 7/046 111/11 |
| 2010/0300341 A1 * | 12/2010 | Peterson ............... A01C 7/046 111/185 |
| 2015/0163990 A1 * | 6/2015 | Audigie ............... A01C 7/046 111/185 |
| 2015/0163991 A1 | 6/2015 | Funck |
| 2016/0338261 A1 * | 11/2016 | Hak ....................... A01C 7/046 |

FOREIGN PATENT DOCUMENTS

| | | |
|---|---|---|
| DE | 3633955 A1 | 5/1987 |
| DE | 3831042 A1 | 3/1989 |
| DE | 29620828 U1 | 5/1997 |
| DE | 69502564 T2 | 12/1998 |
| DE | 10154625 C1 | 4/2003 |
| EP | 0348376 A1 | 12/1989 |
| EP | 0380912 A1 | 8/1990 |
| EP | D636306 A1 | 2/1995 |
| EP | 0705532 B1 | 10/1996 |
| GB | 1407219 A | 9/1975 |
| WO | 2013/186175 A1 | 12/2013 |

* cited by examiner

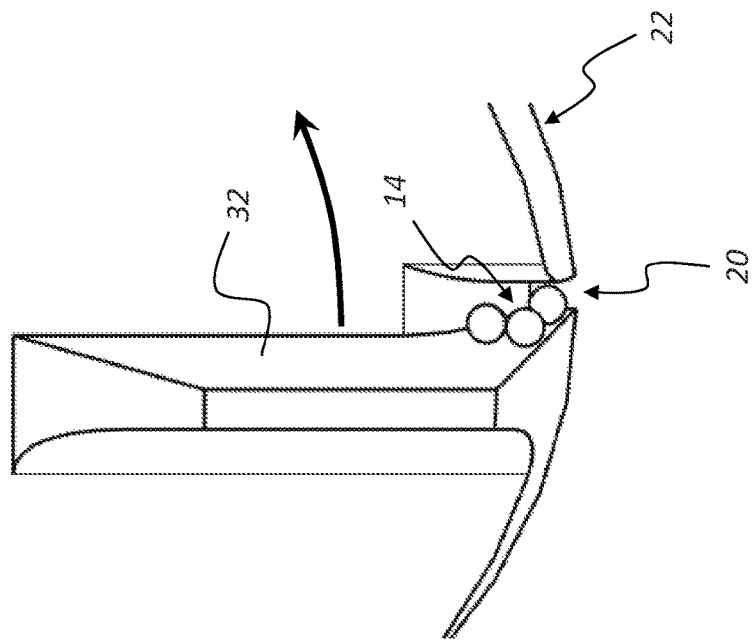
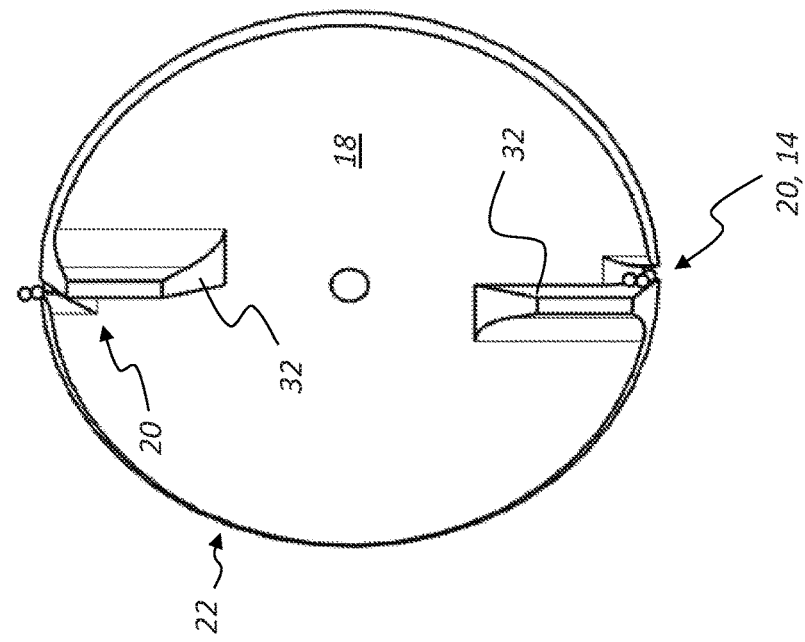

METERING DISK OF A DISTRIBUTION DEVICE FOR GRANULAR MATERIAL

CROSS-REFERENCE TO RELATED APPLICATIONS

This application is a continuation-in-part of U.S. patent application Ser. No. 14/829,205 filed Aug. 18, 2015, which claims priority from German Application No. DE 10 2014 216 370.6 filed Aug. 18, 2014, the contents of which are incorporated herein by this reference.

BACKGROUND OF THE INVENTION

The present invention relates to a metering disk rotating within a distribution device for granular material.

Besides so-called single grain sowing units, distribution devices for granular material or sowing devices that operate volumetrically are known in numerous embodiments. In particular, grain conveyance can, in this context, be carried out by means of an airflow carrying the grains. By the metered feeding of the grains into the airflow, it is possible to vary the volumetric flow of sowed grains. Nevertheless, the grains are often deposited unevenly at the seed drill coulters, as both the precision of the grain metering and the regulation of the airflow can only be influenced to a certain extent, which leads to disadvantages in the growing space allocated to the individual plants.

A device for separating and discharging granular material that is universally applicable for different grain sizes and seed types is known from DE 36 33 955 A1. For this purpose, a rotating, slender hollow cylinder with recesses forming cells at its open front end, a stationary outer cover, and a cover ring arranged within the hollow cylinder are proposed. A storage hopper is separated by a wall from the hollow cylinder, which wall has an opening for the passage of a limited quantity of material to be separated. The length of one of the recess forming cells should equal the length of two or more grains to be separated. Furthermore, a suction opening is provided close to the rear boundary surface of the recesses. The fast rotating hollow cylinder picks up a few grains from the grain supply with each recess such that the outer cover covers the recesses in the filling section and prevents the grains from falling out. The centrifugal force presses the grains into the recesses, while a brush wiper provides for excess grains to be wiped off and fall back into the supply. An outer boundary wall ends in the further course of movement of the hollow cylinder such that grains that are not retained in the recesses by the suction pressure are released outward by centrifugal forces and are fed back into the supply. An additional pneumatic wiper can support this grain singling. At the point of release, the negative pressure is cut off such that the grains are released from the recesses by centrifugal force and gravitational force.

Furthermore, EP 0 636 306 A1 discloses a distribution device for granular material, such as seeds. The distribution device comprises a housing with an inner cover surface taking the form of a circular path, an inlet opening for granular material, a conveyor device for the granular material, which conveyor device rotates concentrically in the housing, and also an outlet opening. In its outer area, the conveyor device has a plurality of openings, which, in a first housing section and together with the inner cover surface of the housing, form a pocket, into which the grains are pushed and circularly conveyed by centrifugal forces supported by the conveyor device. The inlet opening leads into a second housing section. The first housing section and the second housing section are separated by a stationary, contoured disk. The contour of the disk is intended to provide for wiping off excess grains that are being transported in the pockets of the conveyor device. These grains are then available for conveyance again.

The mentioned metering devices are either modified single grain sowing units, which, although they do allow precise grain separation are, however, limited in their processing capacity and in their grain volume flow in comparison to volumetrically metering seed-drill machines and/or are relatively elaborate and prone to failure regarding their structure and their mode of operation. The additional devices that have become known, which are intended to improve the even release of the seeds in volumetrically metering machines, however, do not reach the separation quality of conventional single grain sowing units.

WO 2013/186175 A1, finally, discloses a distribution device for granular material, which distribution device can be employed, in particular, as a sowing unit in a sowing machine. This known unit comprises a housing with an inner cover surface taking approximately the form of a circular path and/or of a circle segment. Rotating concentrically in the housing is a disk-shaped conveyor device for the conveyed granular material or the conveyed seeds, as the case may be. An outlet opening extends approximately tangentially to the inner cover surface of the housing. At its outer periphery, the disk-shaped conveyor device has openings or shoulders, which in connection with the rotation of the disk and with the airflow provide for the circular movements of the grains along the inner cover surface. In a separating section, only one single grain remains in each opening or at each shoulder, as the case may be, of the disk-shaped conveyor device by means of the adjusted contour of the inner cover surface of the housing and under the influence of centrifugal forces, while the excess grains are discharged and fed back into the first housing section for being conveyed again.

The last mentioned sowing unit has proven successful in practice and enables precise grain separation in volumetric grain conveyance, however, it requires accurate adjustment of the recesses or openings located along the periphery of the rotating conveyor disk to the respective grain type being conveyed and sowed. When relatively small grains are conveyed in openings that are too large-sized, it is not possible to separate them precisely, as there will frequently be two, three, or more grains being conveyed in each opening and being released at the same time through the outlet opening. If, in contrast, the openings or recesses are too small, the separating unit will completely fail and will release the grains just as unevenly as they were previously transported into the inlet opening. In order to prevent these problems, it is inevitable in practice to exchange the conveyor disk rotating in the housing when changing the type of grains and to replace it for accordingly appropriately sized disks. As a multi-row sowing machine has a separate metering unit of the construction type described for each seed drill coulter, a corresponding number of sets of replaceable metering disks are required, which not only causes costs, but also requires a high logistics effort from the respective user.

SUMMARY OF THE INVENTION

A primary object of the invention is to prevent these disadvantages for metering units of the construction type as described in WO 2013/186175 A1 and to enable a simply and cost-effectively realizable adjustability of the rotating metering disks to different grain sizes and/or grain contours.

In particular, the metering units should be customizable and convertible to different grain types, grain sizes, and/or grain contours at a reduced logistic effort and such that the respectively best possible separation quality can be obtained when sowing different grain types, grain sizes, and/or grain contours. Thereby, it is also intended to maintain the attainable release precision and/or the grain spacing in a volumetric grain conveyance to such an extent that the grain metering approximates or ideally reaches a single grain metering with regard to its separation quality, while at the same time a high grain volume flow should be enabled, and this preferably with a structure that continues to be simple and not very prone to failure and with a simple mode of operation, as is characteristic of volumetrically metering seed-drill machines.

For achieving the stated object, the invention proposes a conveyor disk rotating within a housing of a metering unit for granular material such as seeds, fertilizer, or the like, and rotating approximately concentrically to an inner cover surface of the housing, said inner cover surface taking approximately the form of a circular path and/or of a circle segment, which conveyor disk has at least one shoulder or one recess at its outer periphery or on a front face for the reception of at least one grain to be separated via at least one revolution of the conveyor disk. These shoulders or recesses can be varied with regard to their size by using replaceable inserts, which are inserted into the conveyor disk and exchanged for inserts with other contours or with differently sized shoulders or recesses.

The metering unit itself, in which the conveyor disk according to the invention rotates, can be, in particular, a unit of the construction type as is described in WO 2013/186175 A1. For such metering units, the invention supplies a simple and cost-effective adjustment to different grain sizes and/or grain contours. In this manner, the correspondingly equipped metering unit can, in particular, be customized and converted for different grain types, grain sizes, and/or grain contours at a highly reduced logistic effort without having to respectively replace the complete conveyor disks. The replaceable inserts in the conveyor disk, which remains mounted, can ensure the respectively best possible separation quality when sowing different grain types, grain sizes, and/or grain contours. In this way it is additionally possible to maintain the respectively realizable release precision and/or the grain distances to be realized in a volumetric grain conveyance to such an extent that the grain metering thereby approximates or ideally reaches a single grain metering with regard to its separation quality, while a high grain volume flow is enabled at the same time. At the same time, metering units are thus provided that are structured in a simple manner and that are hardly prone to failure.

The mentioned metering unit for granular material such as seeds, fertilizer, or the like, which is in particular known from WO 2013/186175 A1, is equipped with a conveyor disk rotating within a housing of the metering unit and approximately concentrically to an inner cover surface of a housing, said inner cover surface taking approximately the form of a circular path and/or of a circle segment, which conveyor disk has at least one shoulder or one recess at the outer periphery or at the outer section of a front face for the reception of at least one grain to be separated via at least one revolution of the conveyor disk. In the interaction with a groove-shaped profile of the inner cover surface, the at least one shoulder or the at least one recess forms a conveyor pocket for conveying one grain or a plurality of grains in the direction toward an outlet opening extending approximately tangentially to the inner cover surface. According to the invention, it is provided that the at least one shoulder or the at least one recess is located at the outer periphery or on the front face at the conveyor disk in an insert element that is detachably anchored or secured in the disk. It can in particular be provided that the at least one shoulder or the at least one recess is essentially formed by the insert element that is detachably anchored in the disk and that accommodates the shoulder or the recess and also an area surrounding this shoulder or this recess.

The conveyor disk according to the invention can optionally have only one such insert receiver at the outer periphery or on the front face, as the case may be, or else two, three, four, or more insert receivers of the same type for detachably anchoring the insert elements, which are each of the same type or each differently designed. In this context, it is in particular provided that two, three, or a plurality of insert receivers each for detachably anchoring one insert element respectively are evenly spaced from one another and distributively arranged over the outer periphery of the conveyor disk.

In this manner, a universal structure for the metering member or the metering unit is accomplished with a replaceable component, which makes it possible to flexibly respond and adjust to different seed types and sowing quantities. The replaceable inserts can thus be adjusted to the respective seed type with regard to their contours and sizes. The inserts additionally allow reacting to varying quantitative requirements.

In a preferred variant of the conveyor disk according to the invention, the insert elements are lockable into a respective insert receivers of the conveyor disk, which insert receivers are designed as snap-in receivers, such that the insert elements can be toollessly exchanged and replaced by other insert elements.

Each of the snap-in receivers can have an approximately rectangular or trapezoidal contour for the approximately flush reception of one insert element respectively in the conveyor disk. It can also be provided that each of the snap-in receivers has guide elements for the respective insert element that is lockable therein, with the guide elements having an insertion direction and a removal direction that is directed approximately radial or approximately axially parallel in relation to the conveyor disk. The plug connections thus created for the toollessly detachable and lockable insert elements additionally secure their precise positioning and prevent incorrect fitting.

In addition, at least one of the insert elements can preferably be formed by two or more insert elements being distributed over the periphery of the conveyor disk as a cover element without a shoulder or recess and fitting flush with the conveyor disk contour. In this manner, the number of recesses provided at the periphery of the conveyor disk can be reduced according to requirements. Not only different sizes and/or different contours of the recesses are thus possible, but it is also possible to employ so-called blind pockets. Employing so-called blind pockets can be particularly useful if a reduction of the grain throughput is desired, which however cannot be realized by a corresponding reduction of the conveyor disk's rotational speed because the conveyor disk should not rotate too slow, for instance, in order to not affect the separation quality. In this manner, the disk's rotational speed can be maintained in a beneficial range, which is necessary for an optimum conveying quality and separation quality of the conveyor disk interacting with the inner cover surface.

A multitude of different insert elements can be stored, for instance, in a storage container accordingly prepared for that purpose, such as an assortment container, and kept ready for an exchange process. In order to prevent confusion as to the insert elements in the process of fitting and removing them, it can be reasonable in this context to work with visually easily discernible codings on the differently designed insert elements. Such codings can be formed, for instance, by color coding, by embossed symbols, numbers, etc., as the respective sizes and fits of the insert elements themselves have to be identical in each case in order to fit into the unaltered and uniform insert receivers or snap-in receivers, as the case may be, of the conveyor disk.

It should be noted that reference is made to the disclosure content of WO 2013/186175 A1 with the present invention.

Furthermore, with the present invention an alternative embodiment of a conveyor disk is disclosed, which rotates within a housing of a metering unit for granular material, such as seeds, fertilizer, or the like, and which rotates approximately concentrically to an inner cover surface of the housing, said inner cover surface taking approximately the form of a circular path and/or of a circle segment. In its outer section, this variant of the conveyor disk has at least one suction hole that is exposed to negative pressure for the reception of at least one grain to be separated via at least one revolution of the conveyor disk. The at least one suction hole is additionally located in an insert element that is detachably anchored in the conveyor disk. This insert element that is detachably anchored in the conveyor disk accommodates the suction hole itself and also an area surrounding this suction hole. Such a conveyor disk that is exposed to negative pressure in general has a plurality or a multitude of holes to which a negative pressure is applied such that seeds are picked up and sucked up from a supply, through which the disk sweeps during its rotation. The grains are then released from the disk at the intended point of release such that grain separation results. Such separating devices are used for corn or for pelleted seeds, for instance. In this context it is also possible that the necessity arises to employ existing conveyor disks or perforated disks for different grain sizes and/or grain shapes without having to replace the disks each time. By using replaceable inserts, which have differently sized and/or shaped suction holes, the disks can be converted to different grain types and/or grain sizes.

Further aspects of such a perforated disk with replaceable inserts can be found for the above-described embodiment, each related to the conveyor disks with lateral or peripheral recesses. All additional and/or optional aspects or embodiments mentioned likewise relate to the perforated disk or conveyor disk that is exposed to negative pressure and referred to here as an alternative embodiment.

In the conveyor disk according to the invention, the at least one recess or the plurality of recesses, as the case may be, is/are located either at an outer circular edge of the conveyor disk and thus extend both into the flat cylindrical, rounded or, for example, also conically beveled, relatively narrow perimeter section of the conveyor disk and into the outer section of one of its flat front faces. If recesses located at the outer periphery of the conveyor disk are referred to in the context of the present application, this can therefore relate to the arrangement described herein, for instance. Also comprised by this description, however, is an arrangement in which the replaceable recesses are located in the front face of the flat conveyor disk without extending into the conical, rounded, or flat cylindrical outer periphery of the disk. This description of the outer periphery furthermore comprises an arrangement, in which the replaceable recesses are primarily located in the conical, rounded, or flat cylindrical outer periphery of the conveyor disk such that they do not extend into the flat front face of the conveyor disk or only do so to a small extent. In this instance, the replaceable inserts can also be formed and referred to as a type of ring segment.

BRIEF DESCRIPTION OF THE DRAWINGS

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

FIG. 3A is a front perspective view of the conveyor disk viewed from the right and showing grains in recesses formed therein.

FIG. 3B is an enlarged and fragmentary view of the conveyor disk as shown in FIG. 3A.

DETAILED DESCRIPTION OF THE INVENTION

Figure 1:
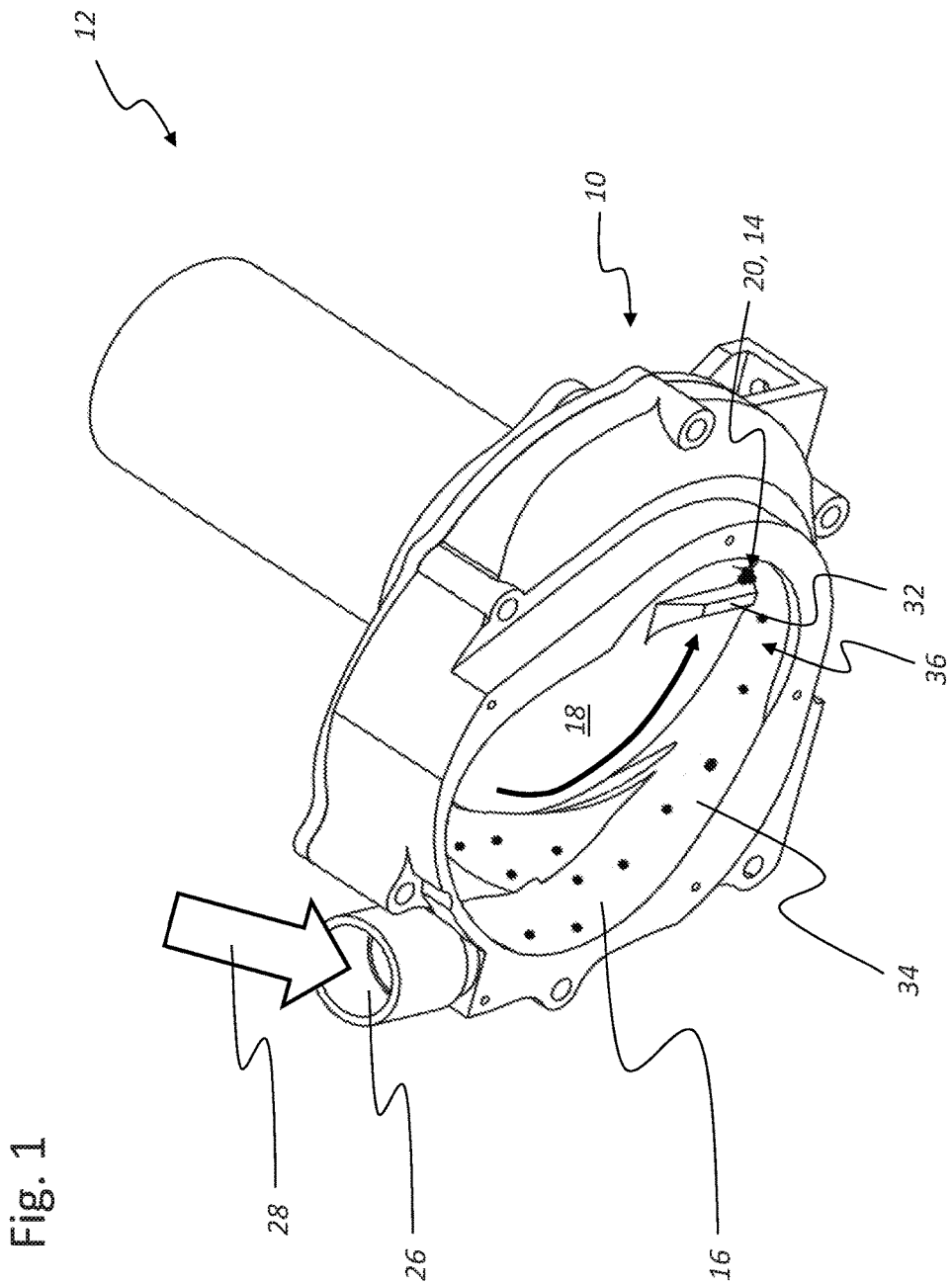
FIG. 1 is a perspective view of a metering unit with portions removed to show a conveyor disk rotating relative to an inner cover surface in a housing of the metering unit.

The same or equivalent elements of the invention are designated by identical reference characters. Furthermore and for the sake of clarity, only the reference characters relevant for describing the respective figure are provided. It should be understood that the detailed description and specific examples of the device and method according to the invention, while indicating preferred embodiments, are intended for purposes of illustration only and are not intended to limit the scope of the invention.

The invention described as follows by means of the FIGS. 1 to 13 comprises a conveyor disk 18 rotating within a housing 10 of a metering unit 12 for granular material such as seeds 14, fertilizer, or the like, and rotating approximately concentrically to an inner cover surface 16 of the housing 10, said inner cover surface 16 taking approximately the form of a circular path and/or of a circle segment, which conveyor disk 18 has at least one entrainment shoulder 32 or one recess 20 at its outer periphery 22 for the reception of at least one grain 14 to be separated via at least one revolution of the conveyor disk 18. According to FIG. 4 and FIG. 5, these shoulders 32 or recesses 20 can be varied with regard to their size by using replaceable inserts, which are inserted into the conveyor disk 18 and exchanged for inserts with other contours or with differently sized shoulders 32 or recesses 20.

The metering unit 12 itself, in which the conveyor disk 18 according to the invention rotates, can be, in particular, a unit of the construction type as is described in WO 2013/186175 A1. The schematic perspective view of FIG. 1 illustrates the structure of such a metering unit 12, which can serve, in particular, as sowing unit of a distribution machine or of a sowing machine. The metering unit 12 comprises a housing 10 with an inner cover surface 16 taking approximately the form of a circular path and/or of a circle segment at least in sections and with an inlet opening 26 for an airflow 28 and granular material or seeds 14 being conveyed therein. For the granular material being carried in the airflow 28, or for the seeds being conveyed therein, the metering unit 12 furthermore comprises the conveyor disk 18, which rotates concentrically in the housing 10, and also an outlet opening 30 (cf. FIG. 2), which is not clearly discernible in FIG. 1, and which extends approximately tangentially to the inner cover surface 16 and releases the seeds or the granular material largely evenly to a seed line, a conveyor line, or the like. In the shown exemplary embodiment, the conveyor disk 18 has one, two (cf. FIG. 2), or a plurality (cf. FIG. 4, FIG. 5) of evenly spaced entrainment shoulders 32 and also recesses 20 arranged immediately thereat for entraining granular material or seeds, as the case may be.

The grains being carried in the airflow 28 are guided through the curved inflow of the inlet opening 26 into the interior space of the housing 10, in which the rotating conveyor disk 18 forms a sort of metering device for the equidistant release of the grains in a direction toward and out of the outlet 30. The airflow 28 provides for the grains to move along the inner cover surface 16 and first along the curved wall surface 34. As the inner cover surface 16 has an inclined housing surface 36 or else a differently formed groove-shaped structure in the further course and in the direction of the outlet opening, the dimensions of which inclined housing surface 36 approximately correspond to the size of the individual grains, the grains are pressed between the wall surface 34, along the inclined housing surface 36 and in the direction of the outlet opening 30 toward the conveyor disk 18 in the further course of movement, where, however, between the entrainment shoulder 32 and the inclined housing surface 36 only one single grain 14 at a time can be accommodated. This is also achieved by the groove-shaped structure or by the inclined housing surface 36 tapering in direction toward the outlet opening 30 in direction of rotation of the conveyor disk 18. Since the groove-shaped tapering of the inner cover surface 16, in addition, tangentially leads into the outlet opening 30 in direction of rotation of the conveyor disk 18, individual grains 14 are respectively released at evenly spaced distances through the outlet opening 30.

Figure 2:
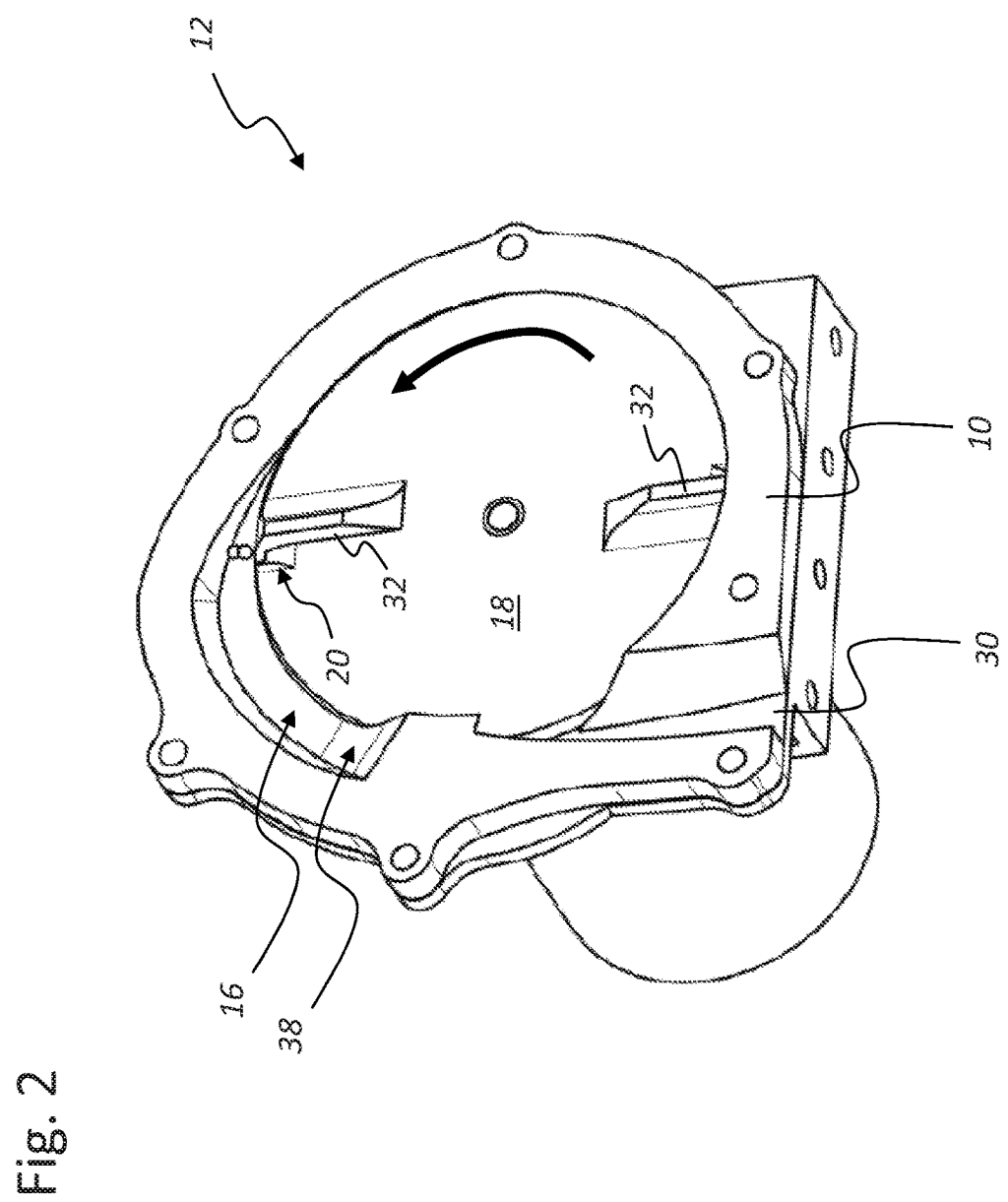
FIG. 2 is a further perspective view of the metering unit.

The schematic perspective view in FIG. 2 shows a part of the housing contour of a metering unit 12 with the conveyor disk 18 rotating therein, which in the shown exemplary embodiment is equipped with two entrainment shoulders 32 arranged opposite each other and the recesses 20 respectively assigned to them. As explained in more detail by means of an exemplary embodiment shown in FIGS. 4 and 5, at least the recesses 20 are changeable in their size, which is achieved by replaceable inserts 40 that can be inserted into the conveyor disk 18 and toollessly removed from it. FIG. 2 illustrates the expanding inner cover surface 16, which allows a targeted guiding of the grains in the interaction with the recesses 20 and the entrainment shoulders 32, and which ensures that exactly one grain 14 is respectively released at the outlet 30 on each passing of one of the recesses 20, while the ramp 38 ensures that excess grains being entrained by the entrainment shoulder 32 remain in the housing 10 and are repeatedly circulated.

Figure 3C:
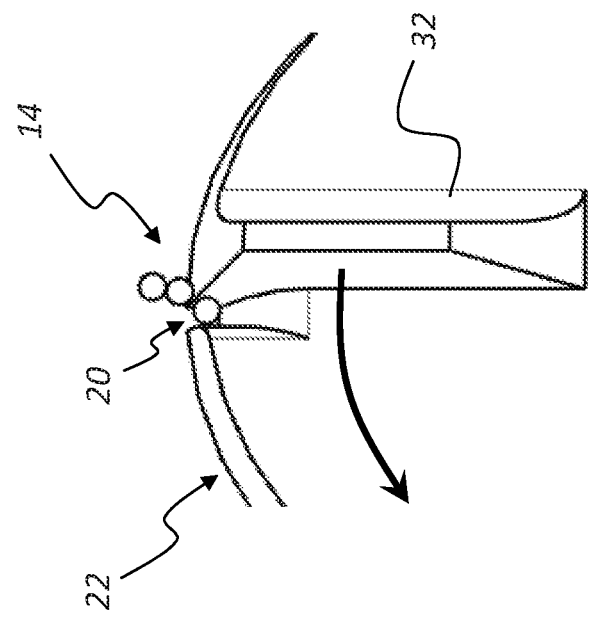
FIG. 3C is a front perspective view of the conveyor disk viewed from the left and showing grains in recesses formed therein.
Figure 3D:
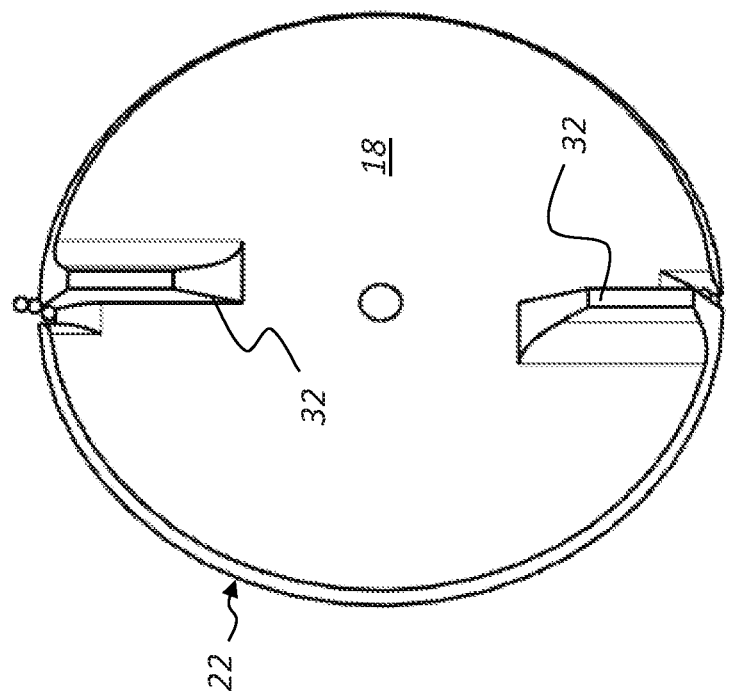
FIG. 3D is an enlarged and fragmentary view of the conveyor disk as shown in FIG. 3C.

The perspective view of FIG. 3A and the detailed illustration of FIG. 3B show an embodiment of the conveyor disk 18 and the entrainment shoulders 32 mounted thereon, which are in this instance combined with indentations or rectangular recesses 20 arranged immediately abutting a shoulder 32 at the outer periphery 22 of the conveyor disk 18 and sized such that one grain 14 (cf. FIG. 3B) at a time can be accommodated in the grooves or recesses 20, while further grains 14, although being conveyed by the entrainment shoulder 32, are pushed aside onto the ramp 38 (cf. FIG. 2) in the further rotational conveying course of the conveyor disk 18 and returned to the supply stock in the housing 10. As also illustrated by the FIGS. 3C and 3D, this method of grain separation is supported by the centrifugal forces of the fast rotating conveyor disk 18, which, in the interaction with the design of the inner cover surface 16 of the housing 10, ensure that only the single grain 14 being located in the groove or recess 20 is conveyed to the outlet 30.

Figure 4:
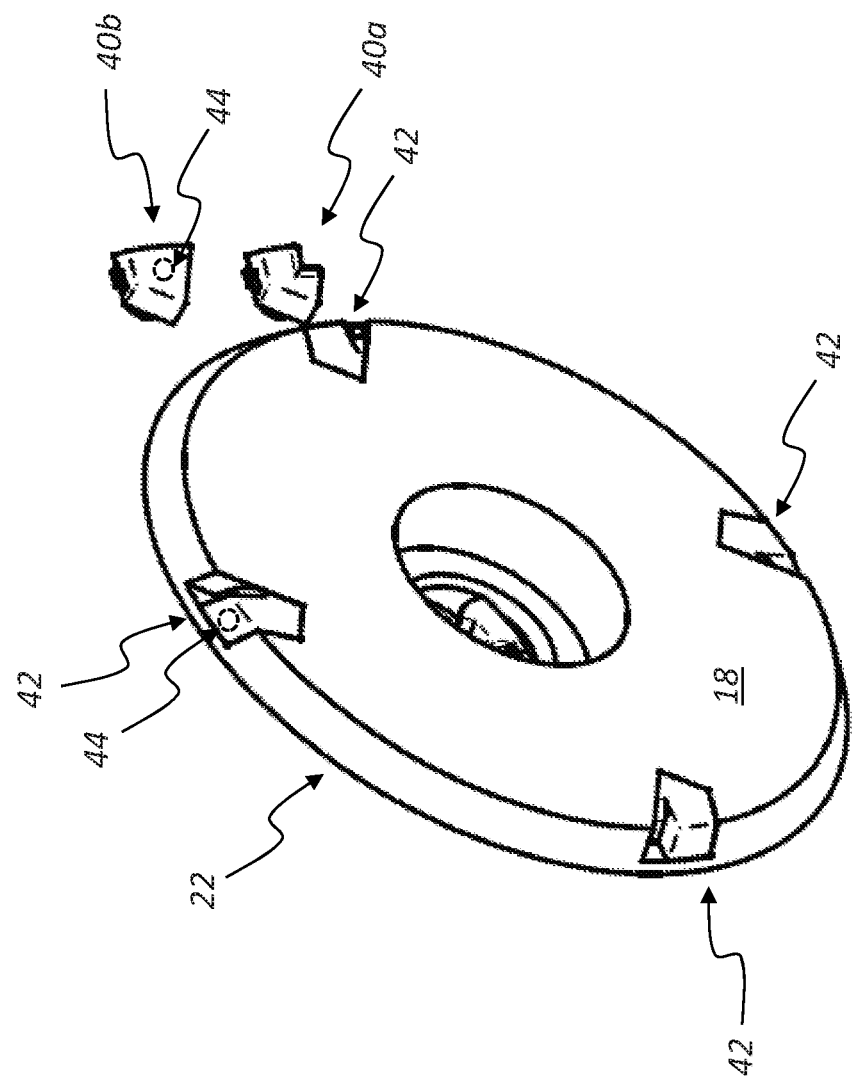
FIG. 4 shows a perspective view of an alternative embodiment of the conveyor disk with two interchangeable and detachable inserts shown therewith.
Figure 5:
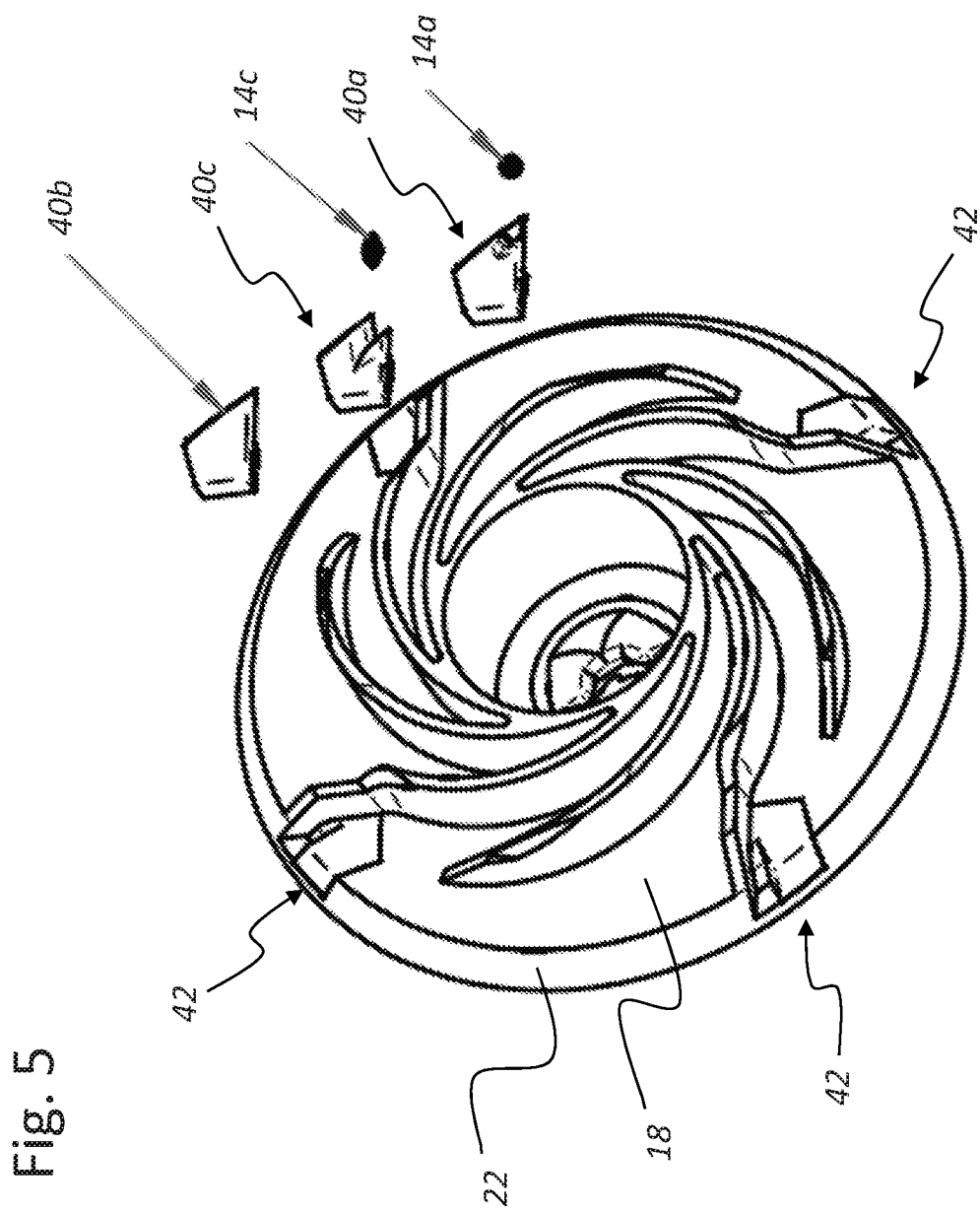
FIG. 5 shows a perspective view of another embodiment of the conveyor disk with three interchangeable and detachable inserts and different sized seeds receivable within recesses in two of the inserts shown therewith.

It should be noted that the recesses 20, as are exemplarily illustrated in FIGS. 1 to 3, can be adjusted to the sizes and/or contours of the grains 14 to be separated as is shown in FIGS. 4 and 5, where the recesses 20 can be changed in their size and/or contour by means of replaceable inserts 40. This optionally also relates to drive shoulders 32, which can be part of the replaceable inserts 40.

These recesses 20 can be varied with regard to their size and/or their contour by using replaceable inserts 40, which are inserted into the conveyor disk 18 and exchanged for inserts 40 with other contours or with differently sized shoulders or recesses 20. In the interaction with the groove-shaped profile of the inner cover surface 16 of the housing 10, the at least one recess 20 forms a conveyor pocket for conveying respectively one grain 14 in the direction toward the outlet opening 30 extending approximately tangentially to the inner cover surface 16. According to the invention, the at least one recess 20 is located at the outer periphery 22 or on the front face 41 of the conveyor disk 18 in an insert element 40 that is detachably anchored in the disk 18. As illustrated by the FIGS. 4 and 5, the at least one recess 20 is essentially formed by the insert element 40 that is detachably anchored in the disk 18 and that accommodates the entrainment shoulder 32 or the recess 20 and also an area surrounding this recess 20. In the exemplary embodiment shown (cf. FIG. 4 and FIG. 5), the recess 20 or the plurality of recesses are located either at an outer circular edge of the conveyor disk 18 and thus extend both into the flat cylindrical, rounded or, for example, also conically beveled, relatively narrow perimeter section of the conveyor disk 18 and into the outer section of one of its flat front faces 41. If recesses 20 located at the outer periphery of the conveyor disk 18 are referred to in the context of the present application, this can therefore relate to such an arrangement. Also contemplated by this description, however, is an arrangement in which the replaceable recesses 20 are located in the front face of the flat disk 18 without extending into the conical, rounded, or flat cylindrical outer periphery of the disk 18. This description of the outer periphery furthermore comprises an arrangement, in which the replaceable recesses 20 are primarily located in the conical or flat cylindrical outer periphery of the conveyor disk 18 such that they do not extend into the flat front face of the conveyor disk 18 or only do so to a small extent. In this instance, the replaceable inserts 40 can also be formed and referred to as a type of ring segment.

The conveyor disk 18 can optionally have only one insert receiver 42 at the outer periphery 22 and/or on the front face, or else two, three, four, or more insert receivers 42 of the same type for detachably anchoring the insert elements 40, which are each of the same type or each differently designed. The variants of FIG. 4 show a smooth-surfaced conveyor disk 18 with a conically beveled edge at the outer periphery 22 and four insert receivers 42, which are arranged facing each other pairwise and which are respectively spaced apart from each other at segment angles of 90 degrees.

As replaceable inserts, the insert elements 40 can be adjusted to the respective seed type with regard to their contours and sizes. The inserts additionally allow reacting to varying quantitative requirements. Preferably, the inserts 40 are lockable into respective insert receivers 42 of the conveyor disk 18, which insert receivers 42 are designed as snap-in receivers, such that the insert elements 40 can be toollessly exchanged and replaced by other insert elements 40.

The variant of FIG. 4 illustrates a first insert element 40a, which is equipped with a receiver 20 of a defined size, and also a second insert element 40b, that has no receiver, but rather takes the form of a so-called blind element, with which no grains are transported. If two such blind elements 40b, for example, are inserted in the instance of such a conveyor disk 18 with a total of four insert receivers 42, only two active receivers 20 will remain, as previously shown in the FIGS. 3A and 3C.

Each of the insert receivers 42 designed as snap-in receivers can have an approximately rectangular or trapezoidal contour, for example, for the approximately flush reception of respectively one insert element 40a or 40b in the conveyor disk 18. It can also be provided that each of the snap-in receivers 42 has guide elements for the insert element 40 that is lockable therein, with the guide elements having an insertion direction and a removal direction that is directed approximately radially or approximately axially parallel in relation to the conveyor disk 18. The plug connections thus created for the toollessly detachable and lockable insert elements 40 additionally secure their exact positioning and prevent incorrect fitting.

The illustration of FIG. 5 once more shows various insert elements 40a, 40b, and 40c, with the first insert element 40a having a small receiver and being suitable for smaller, round seeds 14a. The second insert element 40b has no receiver and takes the form of a blind element, while the third insert element 40c has a larger receiver for lenticular, slightly larger, or longish grains 14c. Fan vanes 43 or the like can be arranged on the front face of the conveyor disk 18, the ends of at least some of the fan vanes 43 merge into the entrainment shoulders 32 at the rear edge of the receivers 42, as is shown in FIG. 5.

Referring again to FIG. 4, an alternative variation is shown in which at least one suction hole 44 may be formed in the insert element 40b and which aligns with a suction hole 44 formed in a receiver 42 formed in conveyor disk 18 when insert element 40b is secured in receiver 42. The aligned suction holes 44 are exposed to negative pressure for the reception of at least one grain to be separated via at least one revolution of the conveyor disk. This insert element 40b in which the suction hole 44 is formed accommodates the suction hole 44 itself and also an area surrounding this suction hole 44. Such a conveyor disk that is exposed to negative pressure in general may have a plurality or a multitude of holes to which a negative pressure is applied such that seeds are picked up and sucked up from a supply, through which the disk 18 sweeps during its rotation. The grains are then released from the disk 18 at the intended point of release such that grain separation results. Such separating devices are used for corn or for pelleted seeds, for instance. In this context it is also possible that the necessity arises to employ existing conveyor disks or perforated disks for different grain sizes and/or grain shapes without having to replace the disks each time. By using replaceable inserts, which have differently sized and/or shaped suction holes, the disks can be converted to different grain types and/or grain sizes.

Figure 6:
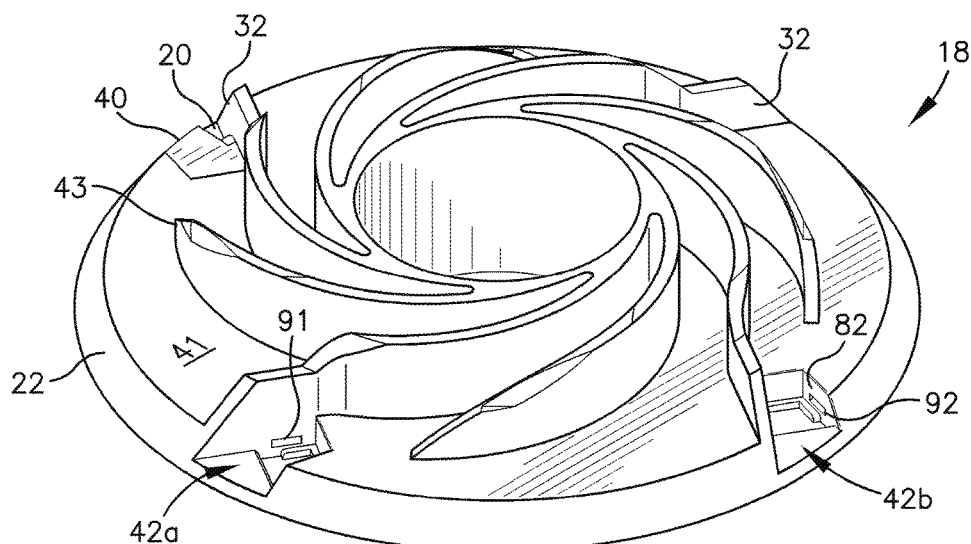
FIG. 6 is a perspective view of the conveyor disk as shown in FIG. 5 showing two insert receivers in the disk without inserts detachably secured therein.
Figure 7:
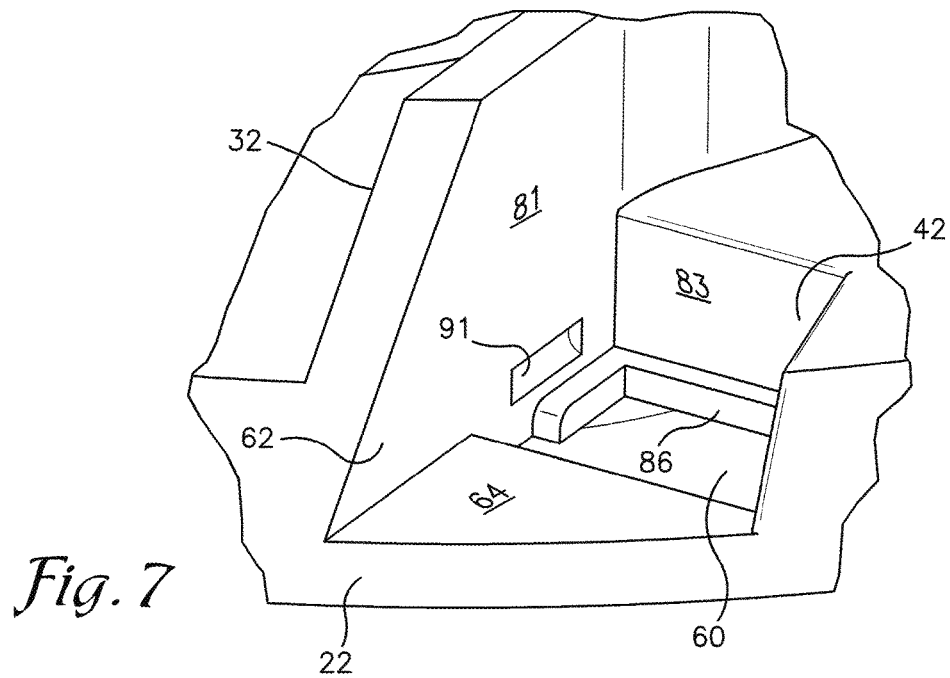
FIG. 7 is an enlarged and fragmentary perspective view of a portion of the conveyor disk showing one of the insert receivers without an insert detachably secured therein.
Figure 8:
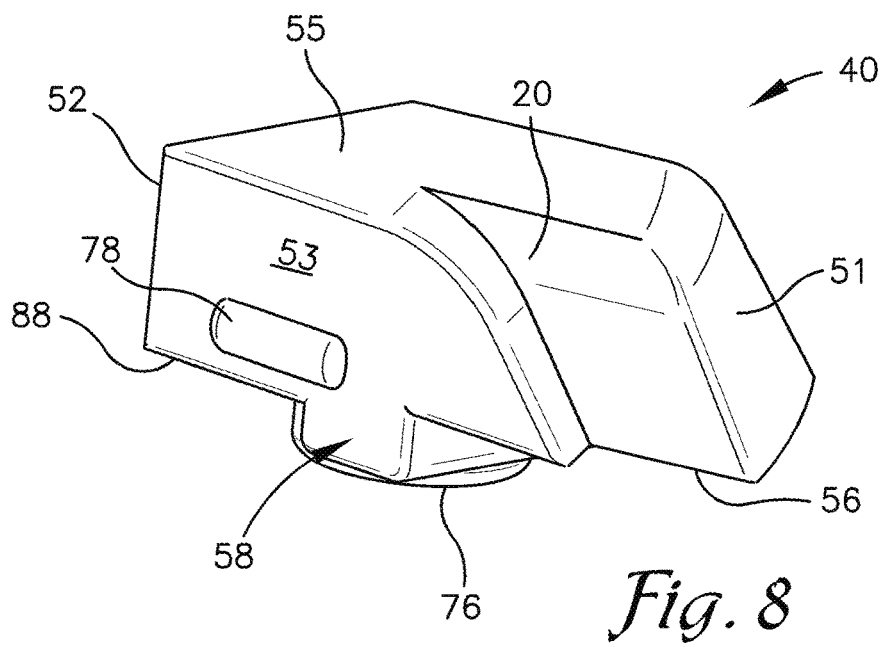
FIG. 8 is a left side perspective view of an insert.
Figure 9:
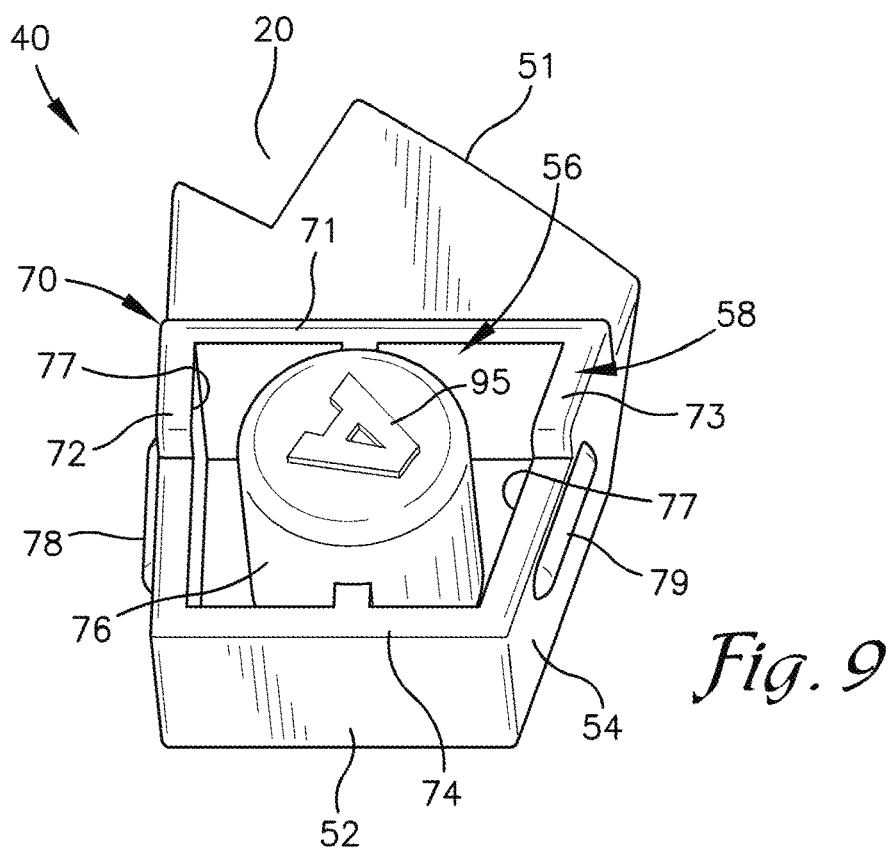
FIG. 9 is a bottom perspective view of the insert as shown in FIG. 8.
Figure 10:
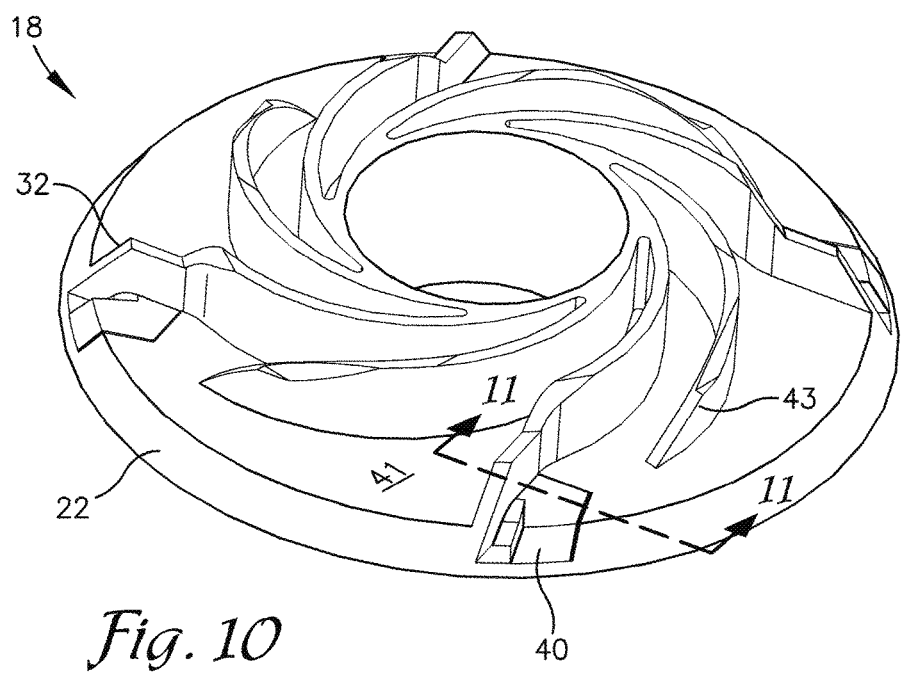
FIG. 10 is perspective view of the conveyor disk shown in FIG. 6 with inserts secured in the insert receivers.
Figure 11:
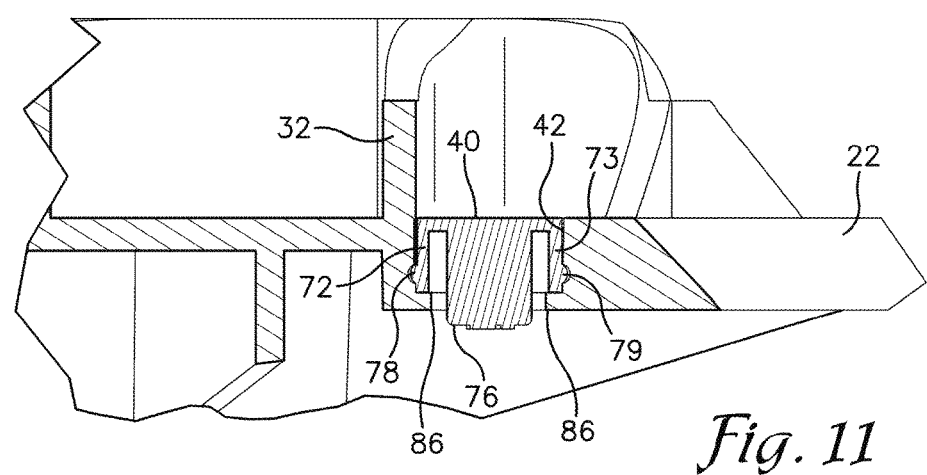
FIG. 11 is a fragmentary cross-sectional view taken along line 11-11 of FIG. 10.
Figure 12:
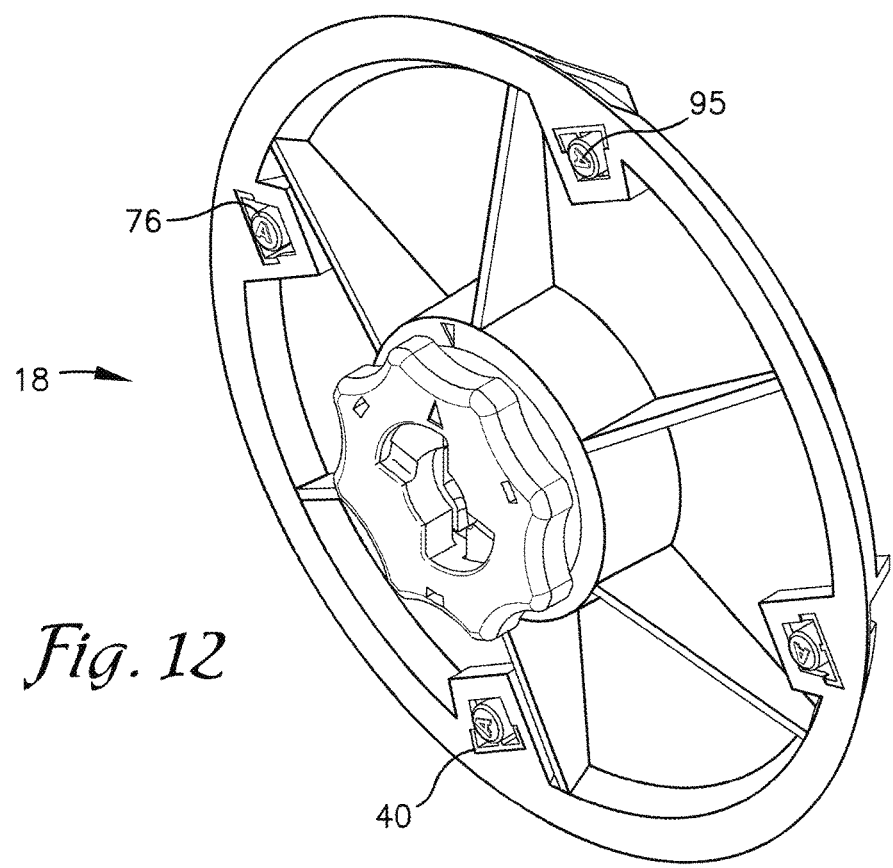
FIG. 12 is a rear perspective view of the conveyor disk.
Figure 13:
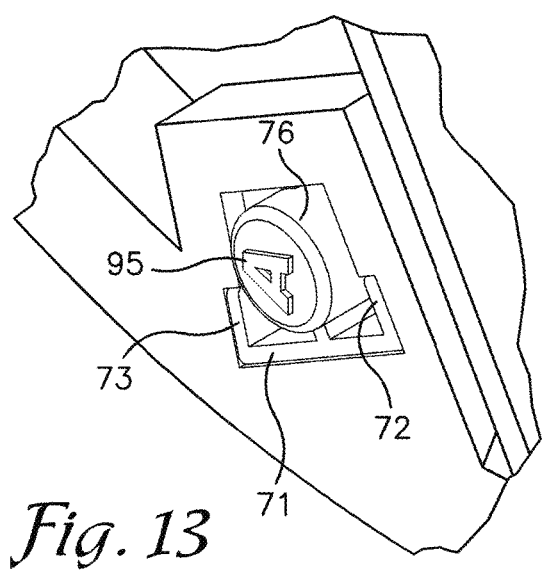
FIG. 13 is an enlarged and fragmentary rear perspective view of the conveyor disk.

Referring to FIG. 6 a conveyor disk 18 of the type shown in FIG. 5 is shown without inserts 40 in insert receivers 42a and 42b. An insert 40, such as the insert 40 shown in FIGS. 8 and 9 and corresponding to insert 40c in FIG. 5, is configured for manual insertion and retention in one of receivers 42a or 42b. As used herein directional references with respect to the insert receivers 42 and inserts 40, such as top, bottom, left, right, front and rear, are made from the perspective of a viewer looking toward a receiver 42 on the disk 18 with the front face 41 of the disk facing upward and with the insert installed in the insert receiver.

Insert 40c includes a peripheral or front face 51, rear end 52, first and second or left and right sides 53 and 54, upper surface or top 55 and bottom 56. A male connector or plug 58 projects downward or outward from the bottom 56 of the insert 40c. In the embodiment shown, recess 20 is formed in the left side 53 of the insert 40c and extends inward from the peripheral face 51 thereof approximately one third of the distance toward the rear end 52.

Each insert receiver 42 is formed as a stepped receiver. An inner portion of each receiver 42 forms a plug receiver 60 that extends completely through the disk 18. An outer portion 62 of each insert receiver 42, which opens to the outer periphery 22 of the disk 18, only extends partially through the disk 18 from the front face 41 to form a ledge 64. The male connector 58 fits snugly within the plug receiver 60 with the portion of the insert 40c extending forward of the male connector 58 extending over and across the ledge 64. When insert 40c is inserted in the receiver insert receiver 42, the front face 51 of the insert 40c extends flush with the outer periphery 22 of the disk 18 and the upper surface 55 of the insert 40c extends flush with the front face 41 of the disk 18.

The male connector 58 is formed as a continuous wall 66 including front wall 71, left and right sidewalls 72 and 73 and rear wall 74 surrounding a stem 76 projecting downward or away from the top of the insert 40. Open areas or cavities 77 are formed between the continuous wall 66 and the stem 76. Left and right projections or bosses 78 and 79 are formed on and project outward from the left and right sidewalls 72 and 73 respectively. The left and right sidewalls 72 and 73 may also be referred to as prongs 72 and 73. The inserts may be formed of synthetic materials or metals such as aluminum alloys. The continuous wall 66 is formed sufficiently thin to allow the left and right sidewalls 72 and 73 to compress laterally toward the stem 76 when inserted in the plug receiver 60 and the left and right sidewalls may be described as resilient.

The plug receiver 60 is surrounded by left and right surfaces or walls 81 and 82, rear surface or wall 83 and front surface or wall (not seen) formed in the disk 18. A relatively narrow, support shoulder or lip 86 projects inward into plug receiver 60 from lower edges of the rear surface 83 and left and right surfaces 81 and 82. The shoulder 86 extends completely across rear surface 83 and partially across the left and right surfaces 81 and 82 starting from the rear surface 83. A recess 88 is formed in the rear wall 74 and rear portions of the left and right sidewalls 72 and 73 of the insert 40 below the projections 78 and 79. The recess 88 is sized to receive or extend over the support shoulder 86 when the insert 40c is inserted in insert receiver 42. Support shoulder 86 supports the rear end 52 of the insert 40c inserted in the receiver 42 and ledge 64 supports the front end of the insert 40c.

Left and right boss receiving grooves 91 and 92 are formed in the left and right surfaces 81 and 82 of the disk 18 surrounding the receiver 42. The geometry of the boss receiving grooves 91 and 92 corresponds to and is slightly larger than the geometry of the bosses 78 and 79 on left and right sidewalls 72 and 73 of the plug 58. As the insert 40 is inserted in insert receiver 42, abutment of the bosses 78 and 78 against the corners of front face of the disk 18 with the left and right surfaces 81 and 82 of the disk 18 around receiver 42 compresses the left and right sidewalls 72 and 73 so that the insert 40 may be pressed further into the receiver 42 with the plug 48 advancing into the plug receiver 60. When the left and right bosses 78 and 79 are advanced into alignment with the left and right boss receiving grooves 91 and 92 respectively, the resilient left and right sidewalls 72 and 73 of the plug 58 expand outward to position the bosses 78 and 79 in the grooves 91 and 92.

Extension of left and right bosses 78 and 79 into left and right boss receiving grooves 91 and 92 resists separation of the insert 40c from the disk 18 and detachably anchors or secures the inserts 40c to the disk 18. The inserts 40c may be removed from the insert receivers 42 by pressing a finger or tool, such as a screw driver, against the bottom of the stem 76 projecting through the bottom of the plug receiver 60. Plug receiver 60 may also be referred to as an access portion of the receiver 42 as it provides access to the stem 76 from the rear of the conveyor disk to allow a user to push an insert 40 out of the receiver 42. Pressing against the bottom of the stem 76, through the plug receiver 60 causes an upper edge of each boss 78 and 79 to engage a corner formed at an upper edge of each groove 91 and 92 with the left and right surfaces 81 and 82 respectively of the disk surrounding the recess 42 which compresses the left and right sidewalls 72 and 73 to permit advancement of the bosses 78 and 79 out of the grooves 91 and 92 and the insert 40c out of the insert receiver 42.

When insert 40c is inserted in the receiver, the recess 20 formed in the left corner of the insert 40c is positioned adjacent the distal or outer end of the associated entrainment shoulder formed 32. The recess 20 of the insert 40c opens radially outward relative to an axis of rotation of the conveyor disk 18 and also opens in a direction generally parallel to the axis of rotation and away from the front face 41 of the conveyor disk 18. The recess 20 positioned adjacent shoulder 32 forms a pocket, with the inner surface 16 of the metering unit 12 relative to which it rotates, for retaining, at least during a portion of the path of rotation of the conveyor disk 18, a single grain 14 of a type of granular material to be singulated by the conveyor disk 18. Indicia 95, such as a letter or number, may be formed on a lower surface of the stem 76 to classify the type of insert 40 based upon the type or geometry of the insert, such as for example, the size and/or shape of the recess 20 formed therein. In the embodiment shown in FIGS. 9, 12 and 13, the indicia shown is the letter A which would therefor correspond to all inserts having the same geometry and construction as the inserts 40c shown in FIGS. 8 and 9. It is to be understood that inserts 40 with different sized recesses 20 or no recess formed therein such as inserts 40a and 40b of FIG. 5 are preferably of similar construction and include bosses projecting from left and right sidewalls of a plug to permit interchangeable insertion and detachable anchoring of such inserts in the receivers 42. Inserts 40a and 40b would be labeled differently than inserts 40c and each other.

The inserts 40 as described and shown with bosses 78 and 79 formed on flexible sidewalls or prongs of the plug portion 58 which extend into the grooves 91 and 92 formed in the surfaces of the disk surrounding the plug receiver 60, are of a type that may be referred to as snap-in inserts and the insert receivers which include the boss receiving grooves 91 and 92 extending into the walls surrounding the insert receiver are of a type that may be referred to as snap-in receivers. The bosses 78 and 79 and the grooves 91 and 92 may also be referred to as first and second mating features respectively and vice versa. It is also to be understood that a male mating feature such as bosses 78 and 79 could also be formed on the walls surrounding the insert receiver 42 and the female mating feature such as grooves 91 and 92 could be formed on the sidewalls or prongs of the plug portion 58.

It is also to be understood that other detachable connection means, in addition to the plug 58 and plug receiver 60 with mating bosses and boss receiving grooves could be used to detachably connect or lock the inserts 40 to the disk 18 in the receivers 42. For example, spring loaded balls in the sidewalls surrounding the receiver 42 could engage detents in the sides of the inserts. The first mating feature on the insert could be a resilient, pronged or hooked tip that overlaps a rear edge of the portion of the disk surrounding the plug receiver 60 with the rear edge engaged by the prong constituting the second mating feature.

The invention has been described with reference to preferred embodiments. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed is:

1. A conveyor disk assembly for use in a metering unit for granular material comprising a conveyor disk that rotates within the metering unit relative to an inner surface of the metering unit and a first insert detachably anchored to the conveyor disk within an insert receiver formed in the conveyor disk, the insert receiver formed in a front face of the conveyor disk proximate an outer periphery thereof, the first insert having a first mating feature detachably engageable with a second mating feature on the conveyor disk in or proximate the insert receiver for detachably securing the first insert in the insert receiver, the first insert having a recess formed therein, such that when the first insert is secured in the insert receiver, the recess of the first insert opens radially outward relative to an axis of rotation of the conveyor disk and also opens in a direction generally parallel to the axis of rotation and away from a front face of the conveyor disk.

2. The conveyor disk assembly as in claim 1 wherein the recess formed in the first insert at least partially forms a pocket of a first size with a portion of the inner surface of the metering unit as the conveyor disk rotates relative thereto for conveying one grain or a plurality of grains of the granular material in a direction toward an outlet opening of the metering unit.

3. The conveyor disk assembly as in claim 1 further comprising a second insert interchangeable with the first insert and detachably securable to the conveyor disk within the insert receiver, the second insert having a first mating feature detachably engageable with a second mating feature on the conveyor disk in or proximate the insert receiver for detachably securing the second insert in the insert receiver, the second insert having a recess formed therein such that when the second insert is secured in the insert receiver, the recess of the second insert opens radially outward relative to an axis of rotation of the conveyor disk and also opens in a direction generally parallel to the axis of rotation and away from a front face of the conveyor disk, the recess formed in the second insert has a size or geometry that differs from the size or geometry of the recess formed in the first insert.

4. The conveyor disk assembly as in claim 3 wherein the recess formed in the first insert at least partially forms a pocket of a first size or shape or both with a portion of the inner surface of the metering unit as the conveyor disk rotates relative thereto for conveying one grain or a plurality of grains of the granular material in a direction toward an outlet opening of the metering unit and the recess formed in the second insert at least partially forms a pocket of a second size or shape or both with a portion of the inner surface of the metering unit as the conveyor disk rotates relative thereto for conveying one grain or a plurality of grains of the granular material in a direction toward an outlet opening.

5. The conveyor disk assembly as in claim 3 wherein the insert receiver is one of a plurality of similarly shaped insert receivers formed in a front face of the conveyor disk proximate an outer periphery thereof, the first insert is one of a plurality of similarly constructed first inserts and the second insert is one of a plurality of similarly constructed second inserts, the first plurality of similarly constructed first inserts and the second plurality of similarly constructed second inserts are detachably and interchangeably secureable to the conveyor disk within the plurality of similarly shaped insert receivers around the conveyor disk.

6. The conveyor disk assembly as in claim 1 wherein at least an access portion of the insert receiver extends completely through the conveyor disk and opens through a rear of the conveyor disk to permit detachment of the first insert from the insert receiver by pressing against a portion of the first insert accessible through the access portion of the insert receiver.

7. The conveyor disk assembly as in claim 3 wherein at least an access portion of the insert receiver extends completely through the conveyor disk and opens through a rear of the conveyor disk to permit detachment of the first or second insert by pressing against a portion of the first or second insert accessible through the access portion of the insert receiver.

8. The conveyor disk assembly as in claim 1 wherein a shoulder is formed on and projects outward from the front face of the conveyor disk adjacent a first side of the insert receiver and the shoulder extends to the outer periphery of the conveyor disk, and wherein the recess is formed in a front corner of the first insert which is positioned adjacent the shoulder when the first insert is detachably secured in the insert receiver.

9. The conveyor disk assembly as in claim 1 in which the insert receiver is a snap-in receiver.

10. The conveyor disk as recited in claim 1 wherein the first insert is a snap-in insert.

11. The conveyor disk assembly as in claim 1 in which at least one suction hole of a first size or shape or both is formed through the first insert and opens through an outer surface of the first insert such that when the first suction hole is exposed to negative pressure at least one grain of the granular material may be secured to the first insert through the negative pressure.

12. A conveyor disk assembly for use in a metering unit for granular material comprising a conveyor disk that rotates within the metering unit relative to an inner surface of the metering unit and a first insert detachably secured to the conveyor disk within an insert receiver formed in the conveyor disk, the insert receiver formed in a front face of the conveyor disk proximate an outer periphery thereof, the first insert having a first mating feature detachably engageable with a second mating feature on the conveyor disk in or proximate the insert receiver for detachably securing the first insert in the insert receiver, the first insert having a recess or a shoulder or both formed thereon, such that, when the first insert is secured in the insert receiver, the shoulder or the recess or both partially form a pocket of a first size or shape or both with a portion of the inner surface of the metering unit as the conveyor disk rotates relative thereto for conveying one grain or a plurality of grains of the granular material in a direction toward an outlet opening of the metering unit.

13. The conveyor disk assembly as in claim 12 further comprising a second insert interchangeable with the first insert and detachably securable to the conveyor disk within the insert receiver, the second insert having a first mating feature detachably engageable with a second mating feature on the conveyor disk in or proximate the insert receiver for detachably securing the second insert in the insert receiver, the second insert having a recess or a shoulder or both formed thereon, such that, when the second insert is secured in the insert receiver, the shoulder or the recess or both partially form a pocket of a second size or shape or both with a portion of the inner surface of the metering unit as the conveyor disk rotates relative thereto for conveying one grain or a plurality of grains of the granular material in a direction toward an outlet opening of the metering unit.

14. The conveyor disk assembly as in claim 13 wherein the insert receiver is one of a plurality of similarly shaped insert receivers formed in a front face of the conveyor disk proximate an outer periphery thereof, the first insert is one of a plurality of similarly constructed first inserts and the second insert is one of a plurality of similarly constructed second inserts, the first plurality of similarly constructed first inserts and the second plurality of similarly constructed second inserts are detachably and interchangeably secureable to the conveyor disk within the plurality of similarly shaped insert receivers formed around the conveyor disk.

15. The conveyor disk assembly as in claim 12 wherein at least an access portion of the insert receiver extends completely through the conveyor disk and opens through a rear of the conveyor disk to permit detachment of the first insert from the insert receiver by pressing against a portion of the first insert accessible through the access portion of the insert receiver.

16. The conveyor disk assembly as in claim 13 wherein at least an access portion of the insert receiver extends completely through the conveyor disk and opens through a rear of the conveyor disk to permit detachment of the first or second insert by pressing against a portion of the first or second insert accessible through the access portion of the insert receiver.

17. The conveyor disk assembly as in claim 12 in which the insert receiver is a snap-in receiver.

18. The conveyor disk as recited in claim 12 wherein the first insert is a snap-in insert.

19. A conveyor disk assembly for use in a metering unit for granular material comprising a conveyor disk that rotates within the metering unit relative to an inner surface of the metering unit and a first insert detachably secured to the conveyor disk within an insert receiver formed in the conveyor disk, the insert receiver formed in a front face of the conveyor disk proximate an outer periphery thereof, the first insert having a first mating feature detachably engageable with a second mating feature on the conveyor disk in or proximate the insert receiver for detachably securing the first insert in the insert receiver, the first insert having at least one suction hole formed therein that is exposed to negative pressure for the reception of at least one grain to be separated through rotation of the conveyor disk, wherein when the first insert is detachably secured in the insert receiver, the suction hole of the first insert opens through an outer surface of the first insert, the suction hole having a first shape or size or both.

20. The conveyor disk assembly as in claim 19 further comprising a second insert interchangeable with the first insert and detachably securable to the conveyor disk within the insert receiver, the second insert having a first mating feature detachably engageable with a second mating feature on the conveyor disk in or proximate the insert receiver for detachably securing the second insert in the insert receiver, the second insert having at least one suction hole formed therein that is exposed to negative pressure for the reception of at least one grain of the granular material to be separated through rotation of the conveyor disk, wherein when the second insert is detachably secured in the insert receiver, the suction hole of the second insert opens through an outer surface of the second insert, the suction hole of the second insert having a second shape or size or both.

* * * * *